United States Patent
Liu et al.

(10) Patent No.: US 10,657,903 B2
(45) Date of Patent: May 19, 2020

(54) DISPLAY SYSTEM AND DRIVING METHOD FOR DISPLAY PANEL

(71) Applicants: BOE Technology Group Co., Ltd., Beijing (CN); Beijing BOE Optoelectronics Technology Co., Ltd., Beijing (CN)

(72) Inventors: Jinxing Liu, Beijing (CN); Xue Dong, Beijing (CN); Dong Chen, Beijing (CN); Wei Sun, Beijing (CN); Lingyun Shi, Beijing (CN); Bo Gao, Beijing (CN); Yan Li, Beijing (CN); Yafei Li, Beijing (CN); Tiankuo Shi, Beijing (CN); Yue Li, Beijing (CN); Shuaishuai Xu, Beijing (CN); Zijiao Xue, Beijing (CN); Wei Wang, Beijing (CN); Shengji Yang, Beijing (CN); Meiling Jin, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 29 days.

(21) Appl. No.: 15/747,381

(22) PCT Filed: Jul. 27, 2017

(86) PCT No.: PCT/CN2017/094703
§ 371 (c)(1),
(2) Date: Jan. 24, 2018

(87) PCT Pub. No.: WO2018/126654
PCT Pub. Date: Jul. 12, 2018

(65) Prior Publication Data
US 2018/0366068 A1    Dec. 20, 2018

(30) Foreign Application Priority Data

Jan. 4, 2017    (CN) .......................... 2017 1 0003903

(51) Int. Cl.
*G09G 3/20*    (2006.01)
*G09G 3/34*    (2006.01)
(Continued)

(52) U.S. Cl.
CPC .............. *G09G 3/34* (2013.01); *G06F 3/013* (2013.01); *G06K 9/00281* (2013.01);
(Continued)

(58) Field of Classification Search
None
See application file for complete search history.

(56) References Cited

U.S. PATENT DOCUMENTS 7,379,078 B1 * 5/2008 Gossweiler, III ..... G06F 3/0346
345/156
9,524,694 B2 * 12/2016 Wang ..................... G09G 5/001
(Continued)

FOREIGN PATENT DOCUMENTS

CN    1705008 A    12/2005
CN    102855845 A    1/2013
(Continued)

OTHER PUBLICATIONS

Oct. 20, 2017—(CN) International Search Report and the Written Opinion Appn PCT/CN2017/094703 with English Tran.
(Continued)

*Primary Examiner* — Shadan E Haghani
(74) *Attorney, Agent, or Firm* — Banner & Witcoff, Ltd.

(57) ABSTRACT

A display system and a driving method for a display panel. The display system includes a display panel, a display area dividing device and a display driving device. A display panel
(Continued)

includes a display area; a display area dividing device is configured to divide the display area of the display panel into at least a first display area and a second display area; a display driving device is configured to drive the first display area with a first refresh frequency and drive the second display area with a second refresh frequency, and the first refresh frequency is greater than the second refresh frequency.

10 Claims, 5 Drawing Sheets

(51) Int. Cl.
    *G06F 3/01*     (2006.01)
    *G06K 9/00*     (2006.01)

(52) U.S. Cl.
    CPC .......... *G06K 9/00604* (2013.01); *G09G 3/20* (2013.01); *G09G 2310/0264* (2013.01)

(56) References Cited

U.S. PATENT DOCUMENTS

| | | | |
|---|---|---|---|
| 9,554,085 B2* | 1/2017 | Iyer | G06F 3/013 |
| 9,607,537 B2 | 3/2017 | Fleck et al. | |
| 9,837,053 B1* | 12/2017 | Cheng | G09G 5/393 |
| 10,043,492 B2* | 8/2018 | Woo | G09G 5/393 |
| 10,281,719 B2* | 5/2019 | Lee | G09G 3/001 |
| 2014/0085276 A1 | 3/2014 | Jang et al. | |
| 2015/0310797 A1 | 10/2015 | Pollok | |
| 2016/0125785 A1 | 5/2016 | Wang et al. | |
| 2017/0221411 A1* | 8/2017 | Chang | G09G 3/20 |
| 2017/0357308 A1 | 12/2017 | Timm et al. | |
| 2018/0102082 A1* | 4/2018 | Pollock | G09G 3/2018 |

FOREIGN PATENT DOCUMENTS

| | | |
|---|---|---|
| CN | 103207664 A | 7/2013 |
| CN | 103680382 A | 3/2014 |
| CN | 103974115 A | 8/2014 |
| CN | 104123906 A | 10/2014 |
| CN | 104423575 A | 3/2015 |
| CN | 105096892 A | 11/2015 |
| CN | 106254952 A | 12/2016 |
| CN | 106652972 A | 5/2017 |
| CN | 106782268 A | 5/2017 |
| EP | 1603108 B1 | 3/2017 |
| WO | 2016022265 A1 | 2/2016 |

OTHER PUBLICATIONS

Mar. 6, 2019—(CN) First Office Action Appn 201710003903.9 with English Translation.

Jul. 17, 2019—(CN) Second Office Action Appn 201710003903.9 with English Translation.

* cited by examiner

DISPLAY SYSTEM AND DRIVING METHOD FOR DISPLAY PANEL

The application is a U.S. National Phase Entry of International Application No. PCT/CN2017/094703 filed on Jul. 27, 2017, designating the United States of America and claiming priority to Chinese Patent Application No. 201710003903.9, filed on Jan. 4, 2017. The present application claims priority to and the benefit of the above-identified applications and the above-identified applications are incorporated by reference herein in their entirety.

TECHNICAL FIELD

Embodiments of the present disclosure relates to a display system and a driving method for a display panel.

BACKGROUND

With improvements of living standards and developments of display technologies, consumers are constantly increasing their demands on the refresh frequency of display systems. Because more realistic display effect can be realized by increasing the refresh frequency, the user experience can be improved, especially for virtual reality display systems. However, the power consumption can be significantly increased when the refresh frequency of the display system is increased; this is contrary to current demands of the consumers for electronic products, especially for consumer electronics.

SUMMARY

An embodiment of the present disclosure provides a display system, which comprises a display panel, a display area dividing device and a display driving device. The display panel comprises a display area; and the display area dividing device is configured to divide the display area of the display panel into at least a first display area and a second display area; and the display driving device is configured to drive the first display area with a first refresh frequency and drive the second display area with a second refresh frequency, and the first refresh frequency is greater than the second refresh frequency.

For example, the display system provided in an embodiment of the present disclosure further comprises an eye-tracking device or/and a video image changing area detection device; and a vision focus area determination device, and the vision focus area determination device is configured to determine a vision focus area based on an output of the eye-tracking device or/and the video image changing area detection device.

For example, in the display system provided in an embodiment of the present disclosure, the first display area is the vision focus area and the second display area is located in the display area outside the vision focus area.

For example, in the display system provided in an embodiment of the present disclosure, the display panel comprises display pixels arranged in an array; and the first display area comprises all the display pixels in a row where the vision focus area locates or in a column where the vision focus area locates.

For example, in the display system provided in an embodiment of the present disclosure, the display area dividing device is further configured to divide the display panel into the first display area, the second display area and a third display area, and the third display area is located between the first display area and the second display area.

For example, in the display system provided in an embodiment of the present disclosure, the display driving device is further configured to drive the third display area with a third refresh frequency that is less than the first refresh frequency and greater than the second refresh rate.

For example, in the display system provided in an embodiment of the present disclosure, the display driving device is configured to increase a frame rate of a video image displayed by the first display area to the first refresh frequency by inserting frame.

For example, in the display system provided in an embodiment of the present disclosure, the display driving device comprises a graphics processing unit; and the graphics processing unit is configured to obtain at least one frame of intermediate image based on two adjacent frames of images of the video image and to increase the frame rate of the video image displayed by the first display area to the first refresh frequency by inserting the at least one frame of intermediate image between the two adjacent frames of images.

Another embodiment of the present disclosure further provides a driving method for a display panel, which comprises: dividing a display area of the display panel into at least a first display area and a second display area; and driving the first display area with a first refresh frequency, and driving the second display area with a second refresh frequency, and the first refresh frequency is greater than the second refresh frequency.

For example, the driving method provided in an embodiment of the present disclosure further comprises determining a vision focus area, and the vision focus area is determined by tracking an eyeball or/and detecting a changing area of a video image.

For example, in the driving method provided in an embodiment of the present disclosure, the vision focus area is taken as the first display area, and at least part of the display area outside the vision focus area is taken as the second display area.

For example, in the driving method provided in an embodiment of the present disclosure, all the display pixels corresponding to a row where the vision focus area locates or a column where the vision focus area locates are taken as the first display area.

For example, in the driving method provided in an embodiment of the present disclosure, the display panel is divided into the first display area, the second display area and a third display area, and the third display area is located between the first display area and the second display area.

For example, the driving method provided in an embodiment of the present disclosure further comprises: driving the third display area with a third refresh frequency, and the third refresh frequency is less than the first refresh frequency and greater than the second refresh frequency.

For example, the driving method provided in an embodiment of the present disclosure further comprises increasing a frame rate of a video image displayed by the first display area to the first refresh frequency by inserting frames.

BRIEF DESCRIPTION OF THE DRAWINGS

In order to clearly illustrate the technical solution of the embodiments of the disclosure, the drawings used in the description of the embodiments or relevant technologies will be briefly described in the following; it is obvious that the described drawings are only related to some embodiments of the disclosure and thus are not limitative of the disclosure.

DETAILED DESCRIPTION

Figure 1:
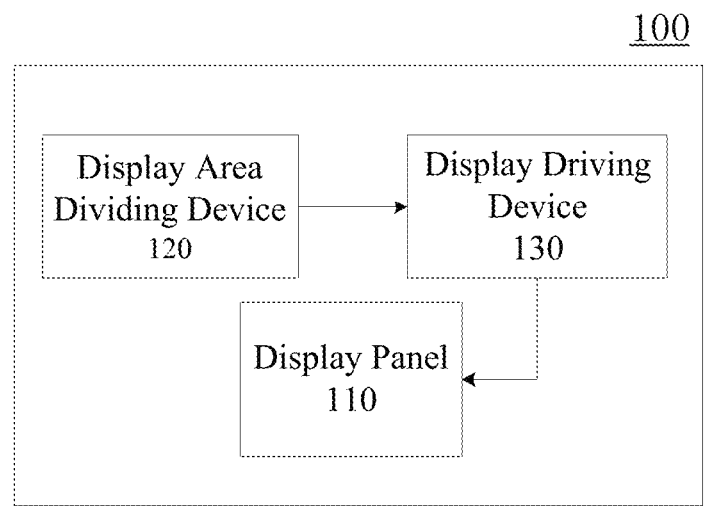
FIG. 1 is an exemplary block diagram of a display system provided by an embodiment of the present disclosure.

In order to make objects, technical details and advantages of the embodiments of the disclosure apparent, the technical solutions of the embodiments will be described in a clearly and fully understandable way with reference to the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

At least one embodiment of the present disclosure provides a display system. The display system comprises a display panel, a display area dividing device and a display driving device. The display panel comprises a display area; the display area dividing device is configured to divide the display area of the display panel into at least a first display area and a second display area; the display driving device is configured to drive the first display area with a first refresh frequency and drive the second display area with a second refresh frequency, and the first refresh frequency is greater than the second refresh frequency. The problem of an increase of the power consumption caused by an increase of the refresh frequency is alleviated by dividing the display area of the display panel into at least the first display area and the second display area.

In different embodiments, for example, the display area dividing device can divide the display area of the display panel into at least the first display area and the second display area according to a working distance of the display panel and a view angle characteristics of distinguish ability of human eyes; for another example, the display area dividing device can also divide the display area of the display panel into at least the first display area and the second display area according to a vision focus area determined by an vision focus area determination device.

For example, a video image, which has a frame rate equal to the first refresh frequency, displayed by the first display area can be obtained by inserting frame through a display driving device; for another example, the video image, which has the frame rate equal to the first refresh frequency, displayed by the first display area can be obtained by receiving the video images with a frame rate equal to the first refresh frequency through the display driving device.

For example, the first display area and the second display area can be respectively driven by one display driving device; for another example, the first display area and the second display area can also be driven by same one display driving device.

Various embodiments of the present disclosure and specific examples of the various embodiments will be described in a non-limitative way with reference to the drawings, as described below, different features of the specific embodiments can be combined with each other to obtain new embodiments in the case of no conflict, and these embodiments also should be within the protection scope of the present disclosure.

For example, FIG. 1 is an exemplary block diagram of a display system 100 provided by an embodiment of the present disclosure. As illustrated in FIG. 1, the display system 100 includes a display panel 110, a display area dividing device 120, and a display driving device 130. For example, the display system 100 can alleviate the problem of the increase of the power consumption caused by the increase of the refresh frequency by dividing the display area of the display panel 110 into at least the first display area and the second display area. For example, the method for dividing the display area by the display area dividing device 120 can be selected according to actual situations; no specific limitation will be given herein.

For example, the display area dividing device 120 can divide the display area of the display panel 110 into the first display area 111 and the second display area 112 (see FIG. 4 and FIG. 5) according to the working distance of the display panel and the view angle characteristics of distinguish ability of human eyes. The view angle characteristics of distinguish ability of human eyes and the principle of dividing the display area with the display area dividing device 120 provided in this embodiment is described below with reference to FIG. 2 and FIG. 3.

Figure 2:
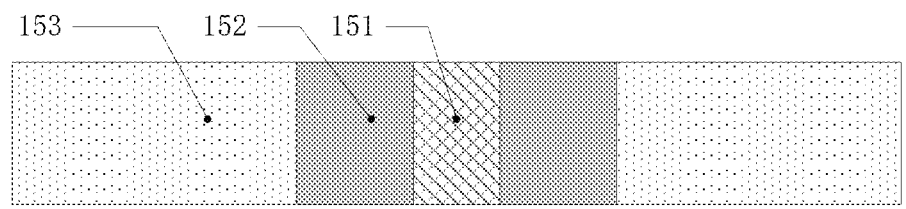
FIG. 2 is a schematic view of dividing a vision field of a human eye.

FIG. 2 is a schematic view of dividing a vision field of a human eye. For an image received by human retina, only a central portion along a horizontal direction can be clearly distinguished, and an area corresponding to the central portion of the image is referred to as a distinguishable vision field 151, and a view angle, corresponding to the distinguishable vision field 151, of the human eye is approximately 15 degrees. An area corresponding to a view angle within a range of 15-30 degree is referred to as an effective vision field 152. In the effective vision field 152, the human eye can immediately see the existence and the movement of the object, but the distinguish ability of human eyes is decreased. The peripheral area corresponding to a view angle exceeds 30 degrees is referred to as an induced vision field 153, and a typical view angle corresponding to the induced vision field 153 is 30 to 100 degrees. In the induced vision field 153, the human eye can only perceive the presence or movement of the object but cannot see clearly what the object or the action is. In such a case, it is necessary to turn the eyeball or head toward the object and let the object fall within a center region of the view angle to distinguish the object or the action. Therefore, the display area dividing device 120 can take a portion of the display area corresponding to the distinguishable vision field 151 of the human eye as the first display area 111.

Figure 3:
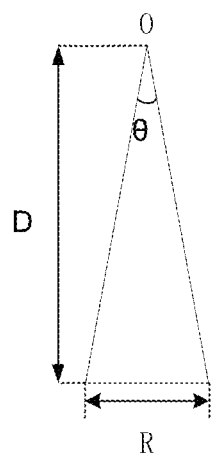
FIG. 3 is a schematic diagram of determining a width of a first display area.

How to divide the display area of the display panel 110 by the working distance of the display panel and the view angle characteristics of distinguish ability of human eyes will be described with reference to FIG. 3 in the following. For example, as illustrated in FIG. 3, a width R of the first display region 111 along the horizontal direction can be set as 2D tan(θ/2), D is the working distance of the display panel, θ is the view angle corresponding to the distinguishable vision field 151 of the human eye along the horizontal direction. Because the distinguish ability of the human eye in a vertical direction is smaller than that in the horizontal direction, the display area dividing device 120 can set the first display area 111 to be a circular region with a diameter R. Obviously, the display area dividing device 120 can also set the first display area 111 to be oval region or rectangular region according to the distinguish ability of the human eye in the vertical direction. No specific limitation will be given to the shape of the first display area 111 by the embodiments of the present application.

For example, the first display area 111 and the second display area 112 obtained according to the working distance of the display panel and the view angle characteristics of distinguish ability of human eyes can also be used as basic data to design a set of display panels 110 with first display areas 111 of different areas. For example, twenty display panels 110 can be designed, and the areas of the first display areas 111 of ten display panels 110 are 1-20% larger than the basic data, and the areas of the first display areas 111 of another ten display panels 110 are 1-20% smaller than the basic data. Then, the areas of the first display area 111 and the second display area 112 can be further optimized in combination with the user experience or the feedback regarding the twenty display panels 110 with the first display areas 111 of different areas. Obviously, the shapes of the first display area 111 and the second display area 112 can be further optimized by the above-mentioned user feedback method.

Figure 4:
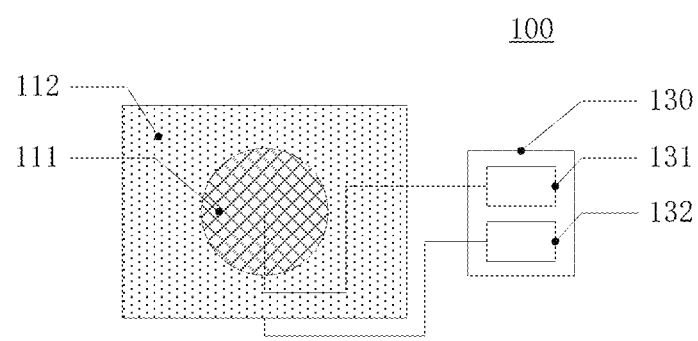
FIG. 4 is a schematic diagram of a structure of a display system provided by an embodiment of the present disclosure.

For example, FIG. 4 is a schematic diagram of a structure of a display system 100 provided by an embodiment of the present disclosure. As illustrated in FIG. 4, the display driving device 130 can include a first display driving device 131 and a second display driving device 132. For example, a set of gate lines and data lines can be respectively disposed for the first display area 111 and the second display area 112, and the gate lines and data lines of the first display area 111 can be electrically connected to the first display driving device 131 through separate wires, and the gate lines and data lines of the second display area 112 can be connected to the second display driving device 132 through separate wires. In such a case, the first display area 111 and the second display area 112 can be two display sub-areas with fixed position in the display panel 110.

For example, the first display driving device 131 can drive the first display area 111 with a first refresh frequency (e.g., 180 Hz) and the second display driving device 132 can drive the second display area 112 with a second refresh frequency (e.g., 60 Hz), and the first refresh frequency is greater than the second refresh frequency. For example, the video image, which has the frame rate equal to the first refresh frequency, displayed by the first display area can be obtained by receiving the video images with a frame rate equal to the first refresh frequency through the display driving device 130. The video images with the frame rate equal to the first refresh frequency can be acquired by, for example, a CPU (Central Processing Unit) and then transferred to the display driving device 130. Because the refresh frequency of the display area of the display panel 110 corresponding to the distinguishable vision field 151 of the human eye is increased, the problem of the increase of the power consumption caused by the increase of the refresh frequency can be alleviated while the display quality is improved.

Figure 5:
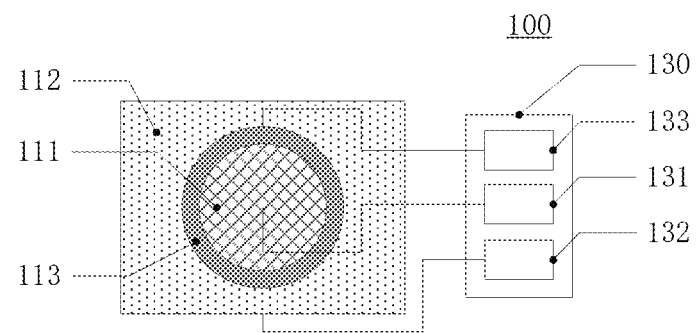
FIG. 5 is a schematic diagram of another structure of a display system provided by an embodiment of the present disclosure.

For example, FIG. 5 is a schematic diagram of another structure of a display system 100 provided by an embodiment of the present disclosure. Compared to the display system 100 illustrated in FIG. 4, the display area of the display system 100 illustrated in FIG. 5 further includes a third display area 113, and the third display area 113 is located between the first display area 111 and the second display area 112. As illustrated in FIG. 5, the display driving device 130 further includes a third display driving device 133. For example, a set of gate lines and data lines can be separately provided for the third display area 113, and the gate lines and the data lines of the third display area 113 can be electrically connected to the third display driving device 133 through separate wires. For example, the third display driving device 133 can drive the third display area 113 with a third refresh frequency, and the third refresh rate (e.g., 120 Hz) is less than the first refresh frequency and greater than the second refresh frequency. The video images, which has a frame rate equal to a third refresh frequency, displayed by the third display area 113 can be obtained by receiving the video images with a frame rate equal to the third refresh frequency through the display driving device 130. The video images with the frame rate equal to the third refresh frequency can be acquired by, for example, a CPU (Central Processing Unit) and then transferred to the display driving device 130. Because the third display area 113 with a refresh frequency between the first refresh frequency of the first display area 111 and the second refresh frequency of the second display area 112 is set between the first display area 111 and the second display area 112, not only the problem of the increase of the power consumption caused by the increase of the refresh frequency can be alleviated while the display quality is improved, but also discomfort of human eyes caused by sudden changes of the refresh frequency in space can be avoided.

Figure 6:
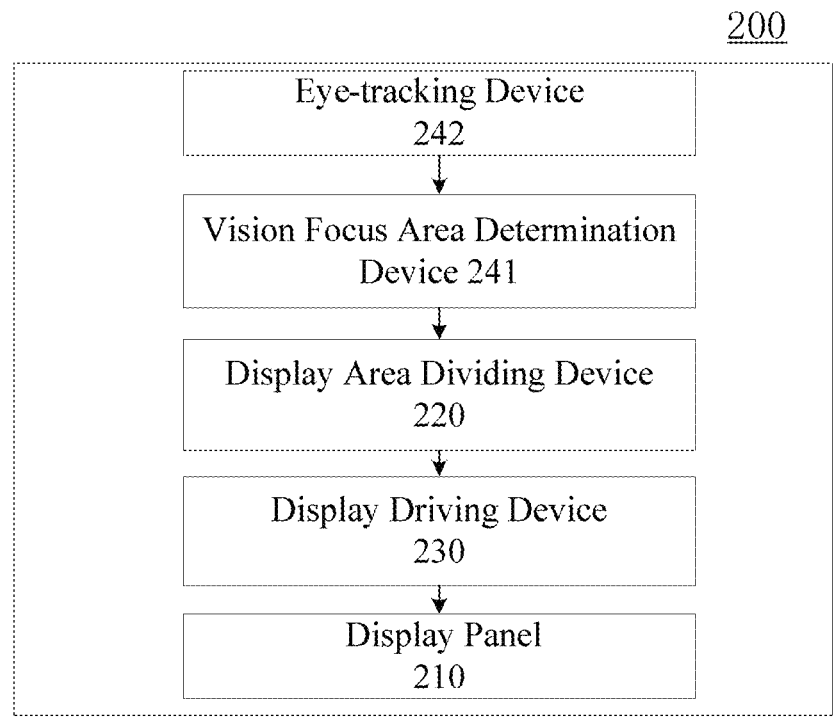
FIG. 6 is an exemplary block diagram of a display system provided by another embodiment of the present disclosure.

For example, FIG. 6 is an exemplary block diagram of a display system 200 provided by another embodiment of the present disclosure, as illustrated in FIG. 6, the display system 200 includes a display panel 210, a display area dividing device 220, a display driving device 230, an eye-tracking device 242 or/and a video image changing area detecting device (not illustrated in FIG. 6), and a vision focus area determination device 241.

For example, the display area dividing device 220 can divide the display area of the display panel 210 into the first display area 211 and the second display area 212 according to the vision focus area 261 determined by the vision focus area determination device 241. In such a case, the first display area 211 and the second display area 212 can be dynamically changed according to the vision focus area 261 along with the time, the display content, and the like. The vision focus area determination device 241 and corresponding method for determining the vision focus area 261 can be set and selected according to actual application requirements; no specific limitation will be given to the embodiments of the present application.

For example, the vision focus area determination device 241 can determine current vision focus area 261 by a real-time direction of line of sight acquired by the eye-tracking device 242, the working distance of the display panel 210 and the distinguishable vision field of the human eye, in which the working distance of the display panel 210 is the distance between the user and the display panel 210. For example, the eye-tracking device 242 can include a CCD-type or CMOS-type camera, a light source, a lens, a capture card, and the like. For example, the eye-tracking device 242 can be disposed on the display system 200, and a light collecting surface of the CCD-type or CMOS-type camera is faced toward human eyes.

Figure 7:
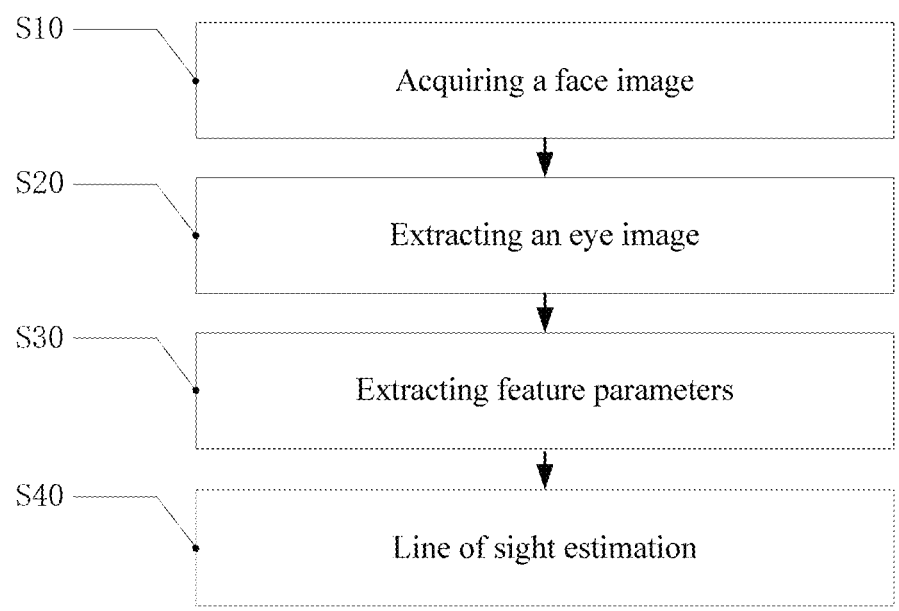
FIG. 7 is an exemplary method for obtaining a real-time direction of line of sight by an eye-tracking device.

For example, the eye-tracking device 242 can obtain the real-time direction of the line of sight by the method illustrated in FIG. 7. (1) Acquiring a face image. For example, the eye-tracking device 242 can directly obtain at least part of the face image of the user when the display panel 210 is close to the user (e.g., smart glasses). The eye-tracking device 242 needs to extract a face image of the user from acquired images when the display panel 210 is far away from the user (for example, a large-sized television). (2) Extracting an eye image. For example, human eyes can be detected and the eye image can be extracted by one or a combination of the following methods: human eye extraction method based on YCrCb color space, Hough transform fitting method, vertical horizontal gray projection method and template matching method. (3) Extracting feature parameters of the eye image. Parameters extracted include pupil center and the corneal reflex bright spot (Purkinje glint). For example, a binary eye image can be obtained by an OSTU threshold segmentation method at first, and then the corneal reflex bright spot can be extracted through determining whether or not the extracted contour is the corneal reflex bright spot, in which whether or not the extracted contour is the corneal reflex bright spot can be determined according to the feature of the Purkinje glint and through adopting roundness and grayness as two features. For example, the pupil center can be located and the pupil center parameter can be extracted by Hough transform fitting method, an ellipse fitting algorithm based on least squares, or a circumferential difference operator algorithm. (4) Line of sight estimation according to the extracted feature parameters. For example, a vector between the pupil center and the conical reflex bright spot (Purkinje glint) can be used to estimate the direction of the line of sight.

For example, the working distance of the display panel 210 can be set according to a typical working distance of the display system 200; this method is more accurate for a near-eye display device such as smart glasses. For another example, the working distance of the display panel 210 can also be measured by a range finder for display devices with large range of working distance, so as to improve the accuracy of the vision focus area 261 acquired by the vision focus area determination device. The ranging device and the corresponding ranging method can be set and selected according to actual application requirements; no specific limitation will be given to the embodiment of the present application.

For example, the working distance of the display panel 210 can be determined by a camera of the eye-tracking device 242 and a measurement result of the range finder. For example, an infrared ranging sensor or an eye-safe laser range finder can be used as the range finder. No specific limitation will be given to the type of the range finder by the embodiment of the present disclosure. For example, the range finder can be mounted on the display system 200 and a signal emitting facet of the range finder is faced toward the user. For example, determining the azimuth of the user by the camera at first; afterwards, rotating the range finder according to the azimuth information of the user, so as to allow the signal beam (e.g., infrared light) outputted by the range finder to be perpendicular to the user; and then, outputting the signal beam to the user with the range finder, and obtaining the distance between the display panel 210 and the user according to the time delay of the received signal beam.

For another example, the working distance of the display panel 210 can also be determined by binocular stereo vision ranging technology with a camera of the eye-tracking device 242 and an additional camera or video camera. For example, an additional camera or video camera can be set on the display system 200 with the light collecting surface facing toward the user. The principle of the binocular stereo vision ranging technology can be interpreted by the following process: using two cameras/video cameras to obtain image coordinates of a target point with different view angles from two viewpoints; and calculating the image coordinate deviation of corresponding image points by the imaging geometric model to obtain the three-dimensional coordinates of the target point, so as to realize the distance measurement. For the binocular stereo vision ranging technology, it is not necessary to install the range finder, not only the cost of the display system 200 can be reduced, but also the safety of the display system 200 can be enhanced. In addition, adopting of binocular stereo vision ranging technology can also improve the determination speed of the working distance of the display panel because rotating of the range finder is not needed.

For example, a specific method for determining current vision focus area 261 by the vision focus area determination device 241 can refer to an embodiment of the present application, in which the specific method is according to the real-time direction of the line of sight acquired by the eye-tracking device 242, the working distance of the display panel 210 set by the typical working distance or obtained by measurement/calculation of the ranging device, and the distinguishable vision field of the human eye, and no further description will be given herein.

For example, the vision focus area determination device 241 can also determine the vision focus area 261 using the video image changing area acquired by the video image changing area detection device. Because the line of sight of the user can be involuntarily focused on the video image changing area while watching the video image, the vision focus area 261 can be determined according to the video image changing area. Depending on the images actually displayed, the video image changing area can be located at different positions of the displayed screen, and not limited to be located at the middle or the like. For example, the video image changing area detection device and the corresponding method for detecting the image changing area can be selected according to actual application requirements; no specific limitation will be given to the embodiment of the present application.

For example, the video image changing area detection method can be divided into a pixel level, a feature level and a target level according to the detection level. The pixel-level detection method detects the change based on calculation and processing of gray values of corresponding pixels of two images; this method can preserve as much raw information as possible, and possess detail information which is not possessed by other detection levels. The feature-level detection algorithm extracts feature information (edge, shape, contour, texture) from original images using a certain algorithm, and then performs comprehensive analysis and changing detection on the feature information; this method has high operation efficiency, and has higher credibility and accuracy in determination of the attribute of the feature, and reduces the interference of external factors on the results on a certain extent. The target-level detection algorithm mainly used for detecting certain objects (targets with clear meaning, such as roads and houses) and performs changing detection based on image understanding and image recognition, and belongs to a high-level analysis method based on target models; this method suits for the user's requirements better and the detection result can be directly applied. For example, based on principles to realize algorithms, the method for detecting the video image changing area can be divided into classification-after-compare changing detection algorithm, compare-after-classification changing detection algorithm, changing detection algorithm based on object and changing detection method based on statistical model. The specific algorithm for the image changing area detection method can be referred to the technical books and documents related to the changing area detection, and no further description will be given herein.

For example, an area of the display panel 210 corresponding to a portion of the human eye with high-distinguish ability can be more accurately determined by introducing the vision focus area determination device 241, and the eye-tracking device 242 or/and the video image changing area detection device. In such a case, it is not necessary to increase the area of the first display area 211 for ensuring the display effect, or to reduce the area of the first display area 211 for reducing the power consumption of the display system 200. Therefore, it is possible to further alleviate the problem of the increase of the power consumption caused by the increase of the refresh frequency while the display effect is ensured or further improved.

Figure 8:
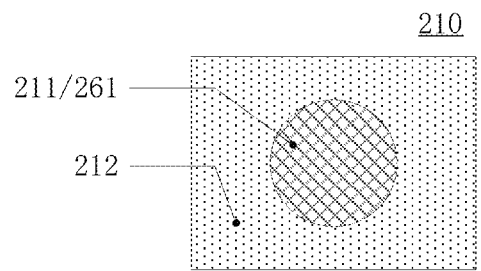
FIG. 8(a) is a schematic diagram illustrating a method for dividing a display area provided by another embodiment of the present disclosure.
FIG. 8(b) is a schematic diagram illustrating another method for dividing a display area provided by another embodiment of the present disclosure.
FIG. 8(c) is a schematic diagram illustrating further another method for dividing a display area provided by another embodiment of the present disclosure.
Figure 8:
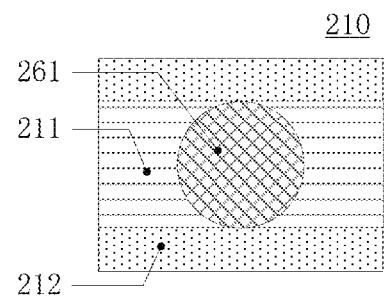
Figure 8:
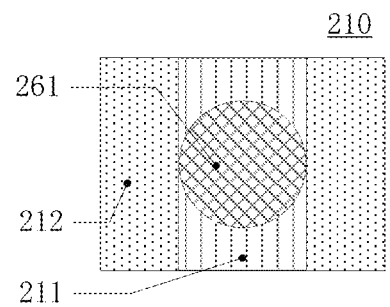

For example, FIG. 8 (a) is a schematic diagram of a method for dividing a display area based on the vision focus area 261 provided by another embodiment of the present disclosure. As illustrated in FIG. 8 (a), the first display area 211 is a vision focus area 261, and the second display area 212 is the display area outside the vision focus area 261. For example, the shape of the vision focus area 261 illustrated in FIG. 8 (a) is only an example, and the shape of the vision focus area 261 can also be an ellipse or other reasonable shapes corresponding to different directions of line of sight. Correspondingly, the shape of the first display area 211 and the shape of the second display area 212 also can be changed correspondingly along with the change of the shape of the vision focus area 261. Therefore, no specific limitation will be given to the shape of the vision focus area 261, the shape of the first display area 211 and the shape of the second display area 212 by the embodiment of the present application.

For example, the display driving device 230 can drive the first display area 211 with a first refresh frequency (e.g., 180 Hz), and drive the second display area 212 with a second refresh frequency (e.g., 60 Hz), in which the first refresh frequency is greater than the second refresh frequency. In such a case, the first display area 211 is a minimum area provided that the display quality is ensured; therefore, the problem of the increase of the power consumption caused by the increase of the refresh frequency can be alleviated maximumly.

For example, the method of dividing the display area according to the vision focus area 261 of the display area dividing device 220 is not limited to the display area dividing method illustrated in FIG. 8 (a), and can also be the method illustrated in FIG. 8 (b) and FIG. 8 (c). As illustrated in FIG. 8 (b), the display panel 210 comprises display pixels arranged in an array, and the first display area 211 comprises all the display pixels in a row where the vision focus area 261 is located, and the second display area 212 is a display area outside the first display area 211. As illustrated in FIG. 8 (c), the display panel 210 comprises display pixels arranged in an array, and the first display area 211 comprises all the display pixels in a column where the vision focus area 261 is located, and the second display area 212 is a display area outside the first display area 211. In such a case, the display system 200 not only can adopt display panels with single-point drivable display pixels, but also can adopt display panels capable of being driven by line scanning/column scanning method, so that the selection range of the display panel 210 of the display system 200 can be widened.

Obviously, the second display area 212 can also be at least part of the display area outside the vision focus area 261. In such a case, at least a third display area can be further provided between the first display area 211 and the second display area 212 (not illustrated in FIGS. 8 (a), 8 (b) and 8 (c)). The display driving device 230 can drive the third display area with a third refresh frequency, which is less than the first refresh frequency and greater than the second refresh frequency. As a result, it is possible to avoid the problem of the discomfort of the human eye caused by a sudden change of the refresh frequency in space.

For example, in this embodiment, the method for dividing the display area by the display area dividing device 220 is not limited to the dividing method based on the vision focus area 261, and the following two methods can also be adopted, that is, a method for dividing the display area based on the working distance of the display panel and the view angle characteristics of distinguish ability of human eyes, and a dividing optimizing method for the display area based on the feedback of the user as described in an embodiment of the present application.

For example, the display driving device 230 can be configured to increase a frame rate of a video image displayed by the first display area 211 to the first refresh frequency (e.g., from the second refresh frequency to the first refresh frequency) by inserting frame (for example, insert at least one frame of image between two existing frames of images). As a result, the problem of the increase of the power consumption of the display driving device 230 caused by receiving of the video signal with high frame rate can be alleviated.

For example, the display driving device 230 can increase the frame rate of the video image displayed by the first display area 211 to the first refresh frequency by a frame rate promotion algorithm. For example, the frame rate promotion algorithm of the display driving device 230 can be selected according to the actual application requirement; no specific limitation will be given to the embodiment of the present application. For example, the frame rate promotion algorithm can include a non-motion compensation type frame rate promotion algorithm and a motion compensation type frame rate promotion algorithm. For example, the non-motion compensation type frame rate promotion algorithm obtains the interpolated frame using linear combinations (e.g., frame repetition and frame averaging) of pixels of current frame and pixels of next frame. Although the non-motion compensation type frame rate promotion algorithm is simple and fast, it does not take the dynamic changing of the scene into consideration, so it works well for static scenes, but blur and jitter tends to be occurred in the processing results of moving scenes. For example, the motion compensation type frame rate promotion algorithm mainly includes motion estimation and motion compensation. Because motion information between adjacent frames is fully taken into consideration in generating the interpolated frame, the motion compensation type frame rate promotion algorithm is currently widely used to increase frame rate. The motion compensation type frame rate promotion algorithm estimates the motion between video frames at first to obtain the motion vector of the frame to be compensated, and then obtains the interpolated frame according to the reference frame and the motion vector to increase the frame rate of the video image.

For example, the display driving device 230 can further comprise a graphics processing unit, and the graphics processing unit (e.g., CPU) can acquire at least one frame (e.g., two frames) intermediate image based on two adjacent frames of images of the video image. Then, the graphics processing unit increases the frame rate of the video image displayed by the first display area 211 to the first refresh frequency by inserting the at least one frame of intermediate image between the two adjacent frames of images.

For example, in this embodiment, the video image with the first refresh frequency displayed by the first display area is not limited to be obtained by inserting the frame of the display driving device, and can also be obtained by receiving the video image with a frame rate equal to the first refresh frequency through the display driving device described in an embodiment of the present application. The video image with the frame rate equal to the first refresh frequency can be obtained by, for example, a CPU (Central Processing Unit) and then transferred to the display driving device. Correspondingly, in an embodiment of the present application, the video image with the frame rate equal to the first refresh frequency displayed by the first display area can also be obtained by inserting the frame through the display driving device.

At least one embodiment of the present disclosure provides a driving method for the display panel, and the method comprises: dividing the display panel into at least a first display area and a second display area; driving the first display area with a first refresh frequency, and driving the second display area with a second refresh frequency, and the first refresh frequency is greater than the second refresh frequency. The problem of the increase of the power consumption caused by the increase of the refresh frequency is alleviated by dividing the display area of the display panel into at least the first display area and the second display area.

Figure 9:
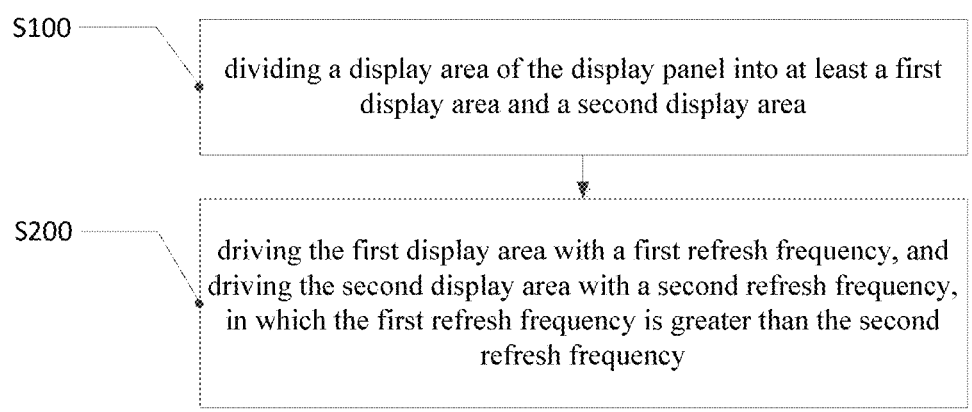
FIG. 9 is an exemplary flowchart illustrating a driving method for a display panel provided by further another embodiment of the present disclosure.

FIG. 9 is a flowchart of a driving method for the display panel provided by another embodiment of the present disclosure. As illustrated in FIG. 9, the driving method for the display panel can comprise the following steps:

Step S100: dividing a display area of the display panel into at least a first display area and a second display area.

Step S200: driving the first display area with a first refresh frequency, and driving the second display area with a second refresh frequency, in which the first refresh frequency is greater than the second refresh frequency.

For example, the display area of the display panel can be divided into the first display area and the second display area according to the working distance of the display panel and the view angle characteristics of distinguish ability of human eyes. In such a case, there is no need to provide devices for determining the vision focus area, thereby the complexity and the cost of the display system is reduced. The method for dividing the display area based on the working distance of the display panel and the view angle characteristics of distinguish ability of human eyes can be referred to an embodiment of a display system of the present application, and no further description will be given herein.

For example, the first display area and the second display area obtained according to the working distance of the display panel and the view angle characteristics of distinguish ability of human eyes can also be used as the basic data to design a group of display panels with first display areas of different areas and/or shapes. Then the user experience or feedback regarding the display panels with the first display areas of different areas and/or shapes is combined to further optimize the area and/or the shape of the first display area and the second display area. The specific content can refer to the embodiments of the display system of the present application, and no further description will be given herein.

For example, the display area of the display panel can also be divided into the first display area and the second display area according to the obtained vision focus area. The vision focus area can be determined by, for example, a method of tracking an eyeball or/and detecting a changing area of the video image. A method for determining a vision focus area based on tracking an eyeball or/and detecting a changing area of a video image can refer to an embodiment of a display system of the present application, and no further description will be given herein. In such a case, an area of the display panel 210 corresponding to a portion of the human eye with high-distinguish ability can be determined more accurately, and there is no need to enlarge the area of the first display area to ensure the display effect or to reduce the area of the first display area to reduce the power consumption of the display system. Therefore, it is possible to further alleviate the problem of the increase of the power consumption caused by the increase of the refreshing frequency while ensuring or further improving the display effect.

For example, the vision focus area can be taken as the first display area, and at least part of the display area outside the vision focus area can be taken as the second display area. In such a case, the first display area is a minimum area provided that the display quality is ensured, so that the problem of the increase of the power consumption caused by the increase of the refreshing frequency can be alleviated maximumly. For another example, all the display pixels corresponding to a row where the vision focus area locates or a column where the vision focus area locates are taken as the first display area. In such a case, the display system not only can adopt display panels with single-point drivable display pixels, but also can adopt display panels capable of being driven by line scanning/column scanning method, thereby the selection range of the display panel of the display system can be widen.

For example, the display panel can be divided only into the first display area and the second display area. In such a case, the problem of the increase of the power consumption caused by the increase of the refreshing frequency can be alleviated to the utmost extent. For another example, the display panel also can be divided into the first display area, the second display area and the third display area, and the third display area is located between the first display area and the second display area and the third display area can be driven by the third refresh frequency, and the third refresh frequency is less than the first refresh frequency and greater than the second refresh frequency. In such a case, it is possible to avoid the discomfort of human eyes caused by sudden changes of the refreshing frequency in space.

For example, the video image with the frame rate equal to the first refresh frequency displayed by the first display area can be obtained by receiving a video image with a frame rate equal to the first refresh frequency with the display driving device, and the video image with the frame rate equal to the first refresh frequency can be acquired by, for example, a CPU (Central Processing Unit) and then transferred to the display driving device. For another example, the video image with the frame rate equal to the first refresh frequency displayed by the first display area can also be obtained by inserting frame with the display driving device. The specific algorithm for increasing the frame rate of the display driving device can refer to the embodiments of the display system of the present application, and no further description will be given herein.

For example, a set of gate lines and data lines can be respectively disposed for the first display area and the second display area, and the gate lines and the data lines of the first display area can be electrically connected to the first display driving device through separate wires. The gate lines and the data lines of the second display areas can be electrically connected to the second display driving device through separate wires. In such a case, driving algorithms for the first display driving device and the second display driving device are simple and direct. For another example, the first display area and the second display area can be driven by same display driving device. In such a case, the first display area and the second display area can be constantly changed along with time according to actual application requirements.

Embodiments of the present disclosure provide a display system and a driving method for the display panel. The problem of the increase in power consumption caused by the increase of the refresh frequency is alleviated by dividing a display area of the display panel into at least a first display area and a second display area.

What are described above is related to the illustrative embodiments of the disclosure only and not limitative to the scope of the disclosure; the scopes of the disclosure are defined by the accompanying claims.

The application claims priority to the Chinese patent application No. 201710003903.9, filed on Jan. 4, 2017, the entire disclosure of which is incorporated herein by reference as part of the present application.

What is claimed is:

1. A display system, comprising:
a display panel comprising a display area;
a display area dividing device configured to divide the display area of the display panel into at least a first display area and a second display area;
a display driving device configured to drive the first display area with a first refresh frequency and drive the second display area with a second refresh frequency; and
a first group of gate lines, a first group of data lines, a second group of gate lines, a second group of data lines,
wherein the first refresh frequency is greater than the second refresh frequency;
the first display area and the second display area are two display areas with fixed positions in the display panel;
the second display area encircles the first display area;
the display driving device comprises a first display driving device and a second display driving device;
the first display area connects the first display driving device via the first group of gate lines and the first group of data lines, and the second display area connects the second display driving device via the second group of gate lines and the second group of data lines;
the first group of gate lines and the second group of gate lines do not share a common gate line, and the first group of data lines and the second group of data lines do not share a common data line; and
the first display driving device is configured to drive the first display area with the first refresh frequency, and the second display driving device is configured to drive the second display area with the second refresh frequency.

2. The display system according to claim 1, wherein the display area dividing device is further configured to divide the display panel into the first display area, the second display area and a third display area, and wherein the third display area is located between the first display area and the second display area.

3. The display system according to claim 2, wherein the display driving device is further configured to drive the third display area with a third refresh frequency that is less than the first refresh frequency and greater than the second refresh frequency.

4. The display system according to claim 1, wherein the display driving device is configured to increase a frame rate of a video image displayed by the first display area to the first refresh frequency by inserting frame.

5. The display system according to claim 4, wherein the display driving device comprises a graphics processing unit; and
the graphics processing unit is configured to obtain at least one frame of intermediate image based on two adjacent frames of images of the video image and to increase the frame rate of the video image displayed by the first display area to the first refresh frequency by inserting the at least one frame of intermediate image between the two adjacent frames of images.

6. The display system according to claim 1, wherein the display area dividing device is configured to divide the display area of the display panel into at least the first display area and the second display area according to a working distance of the display panel and view angle characteristics of distinguish ability of human eyes.

7. A driving method for a display panel, comprising:
dividing a display area of the display panel into at least a first display area and a second display area; and
driving, by a first display driving device, the first display area with a first refresh frequency, and driving, by a second display driving device, the second display area with a second refresh frequency, wherein the first refresh frequency is greater than the second refresh frequency;

the first display area and the second display area are two display areas with fixed positions in the display panel;

the second display area encircles the first display area;

the first display area connects the first display driving device via a first group of gate lines and a first group of data lines, and the second display area connects the second display driving device via a second group of gate lines and a second group of data lines; and the first group of gate lines and the second group of gate lines do not share a common gate line, and the first group of data lines and the second group of data lines do not share a common data line.

8. The method according to claim 7, wherein the display panel is divided into the first display area, the second display area and a third display area, and the third display area is located between the first display area and the second display area.

9. The method according to claim 8, further comprising:

driving the third display area with a third refresh frequency, wherein the third refresh frequency is less than the first refresh frequency and greater than the second refresh frequency.

10. The method according to claim 7, further comprising:

increasing a frame rate of a video image displayed by the first display area to the first refresh frequency by inserting frames.

* * * * *